June 17, 1969       H. T. SIMMONS         3,450,854
CONTROL MEANS FOR A PRESSURE RESPONSIVE SWITCH
Filed March 30, 1967                Sheet 1 of 3
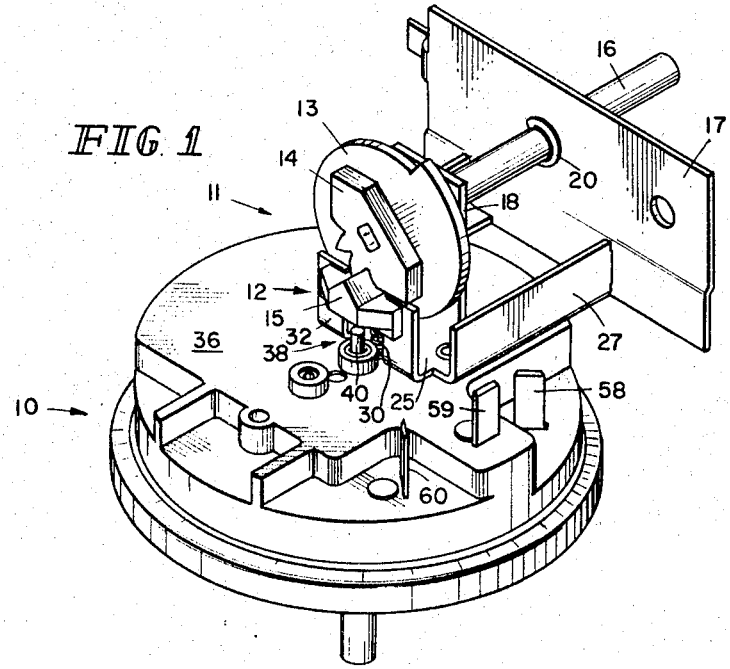
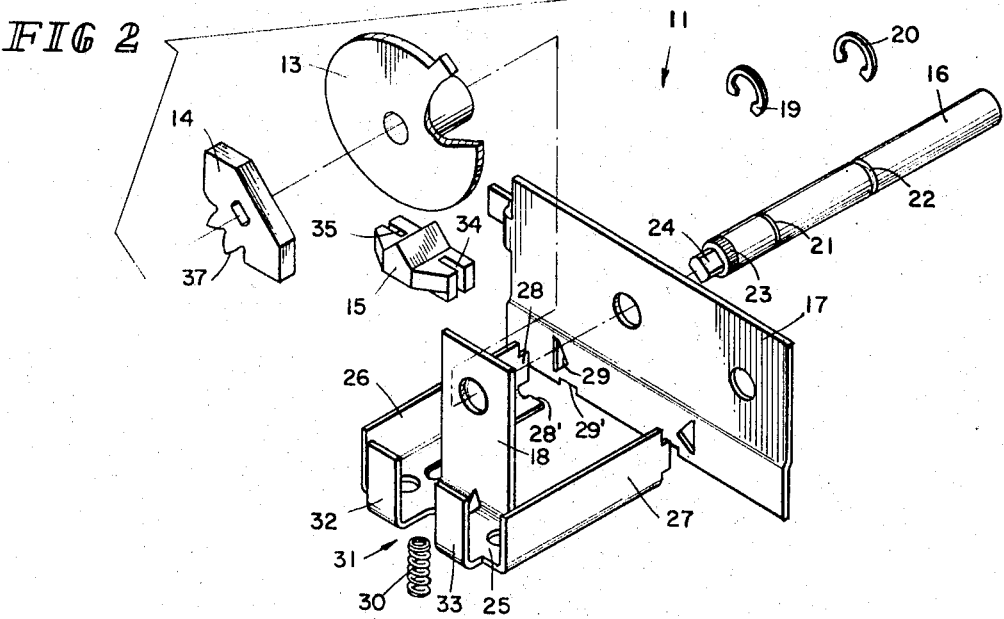
INVENTOR
HAROLD T. SIMMONS
BY
ATTORNEY

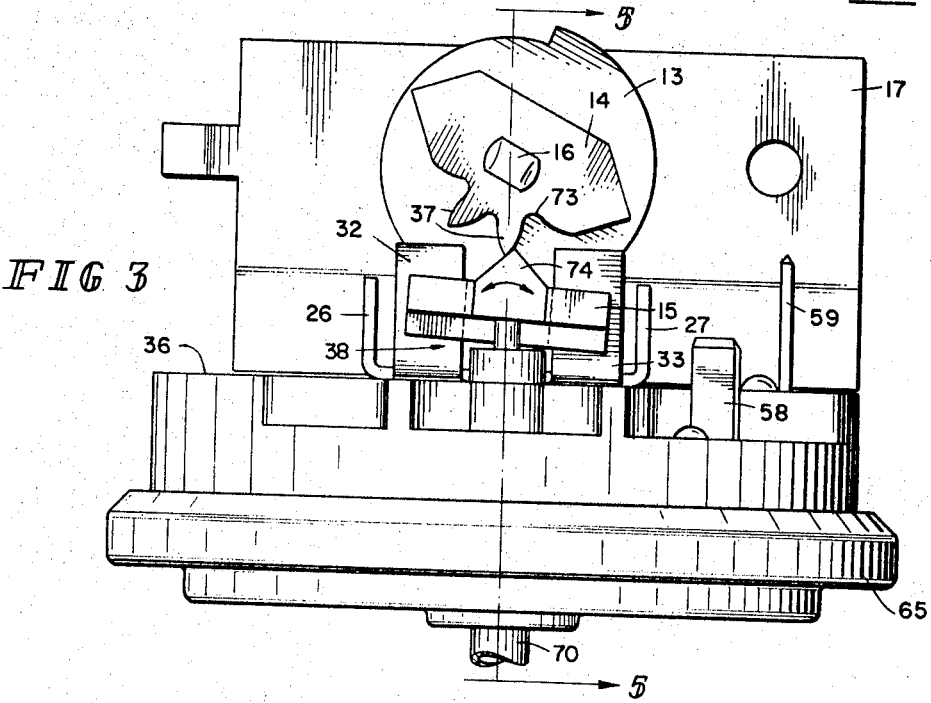
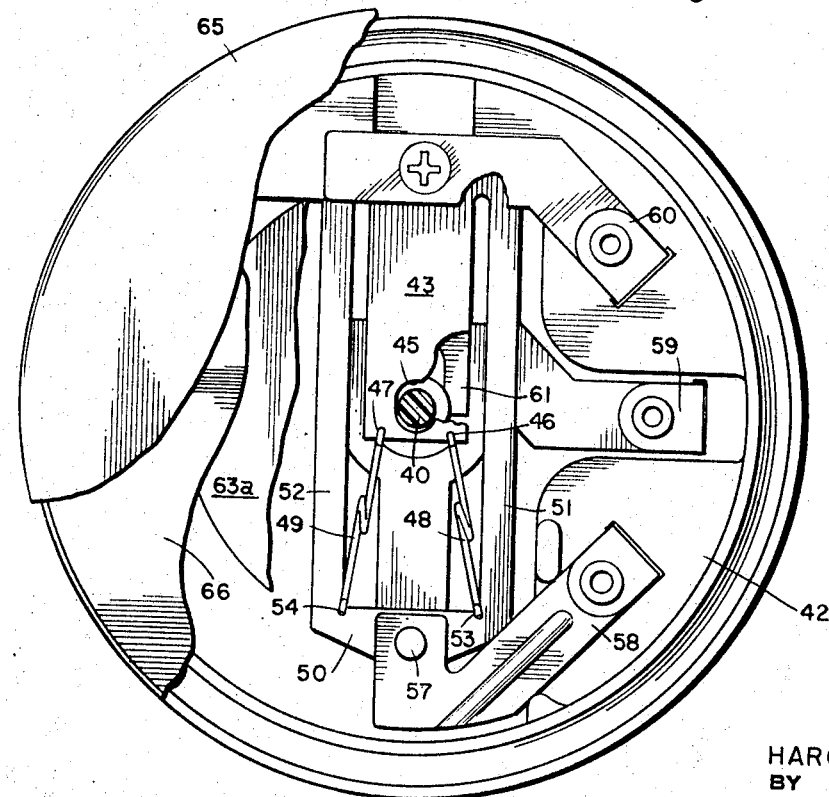

INVENTOR
HAROLD T. SIMMONS
BY
*Robert Levine*
ATTORNEY

United States Patent Office 3,450,854
Patented June 17, 1969

3,450,854
CONTROL MEANS FOR PRESSURE RESPONSIVE SWITCH
Harold T. Simmons, Indianapolis, Ind., assignor to P. R. Mallory & Co., Inc., Indianapolis, Ind., a corporation of Delaware
Filed Mar. 30, 1967, Ser. No. 627,144
Int. Cl. H01h 35/40
U.S. Cl. 200—83                9 Claims

ABSTRACT OF THE DISCLOSURE

A pressure responsive switch that is actuated by fluid pressure acting against a diaphragm. A control means calibrates and sets an overcenter snap switch, the control means having a calibration means and a detent cam with an actuator responsive to the cam. The detent cam with the actuator is so constructed that the actuator cannot get "hung up" on the cam.

---

Figure 5:
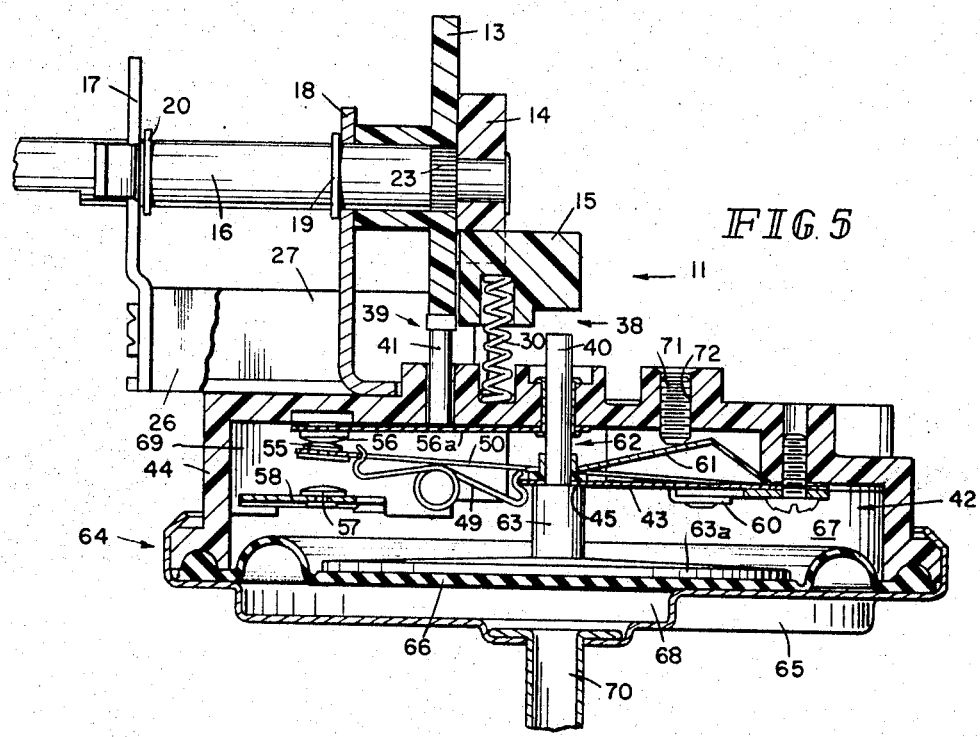

In pressure switches cooperatively associated with electrical appliances, it is desirable that the pressure switch be capable of being responsive to a plurality of predetermined fluid pressures such that the operator may select a desired fluid fill level from a plurality of possible fluid levels. It is also desirable that the fluid pressure responsive means also include means that compensates for variations in the mechanical components as a result of mass production of the switches. Such variations may introduce variations in fluid fill levels of several different fluid pressure responsive means. In addition, it is necessary that the fluid pressure responsive means be inherently capable of resetting itself if the fluid container is connected with other means which cycles the fluid into and out of the container.

The pressure switch of the present invention is particularly useful when utilized with an electrical agitating means such as a washing machine or the like. However, it will be apparent to those having ordinary skill in the art that the present invention would have utility when used in conjunction with many other devices wherein it is desirable to actuate an operatively associated device when a predetermined pressure is exceeded.

The present invention is concerned with a pressure responsive switch and has as one of its objects the provision of such a switch wherein a novel control means permits a flexible sheet or diaphragm to be responsive to one of a plurality of condition pressure levels.

Another object of the invention is to provide a pressure responsive switch having a novel control means including a calibrating means that accurately controls the fluid pressure level of a plurality of available fluid pressures to which the diaphragm is responsive.

Another object of the invention is to provide a pressure responsive switch having a control means which is of a sturdy construction composed as a self-contained device that is efficient, simple, accurate, and inexpensive to produce.

Still another object of the invention is to provide a manually adjustable pressure responsive switch having a novel control means including having a fixed reset pressure level.

Yet another object of the invention is to provide a pressure responsive switch having a novel control means including a plurality of fixed differential reset pressure levels.

Another object of the invention is the provision of a pressure responsive switch having a novel control means having a constant differential pressure level calibration means.

Yet still another object of the invention is to provide a pressure responsive switch having a control means including an overcenter snap switch that includes a plurality of straight line coil springs and a return spring.

Another object of the invention is to provide a pressure responsive switch having a control means including a calibration means and an indexing means coupled to the calibration means.

Still another object of the invention is to provide a pressure responsive switch having a control means including an indexing means which will always reset in any one of selected positions without hanging up and preventing switch actuation.

With the above and other objects in view, which will appear as the description proceeds, this invention resides in the novel construction and arrangement of parts as hereinafter described and more particularly as defined in the appended claims.

Figure 6:
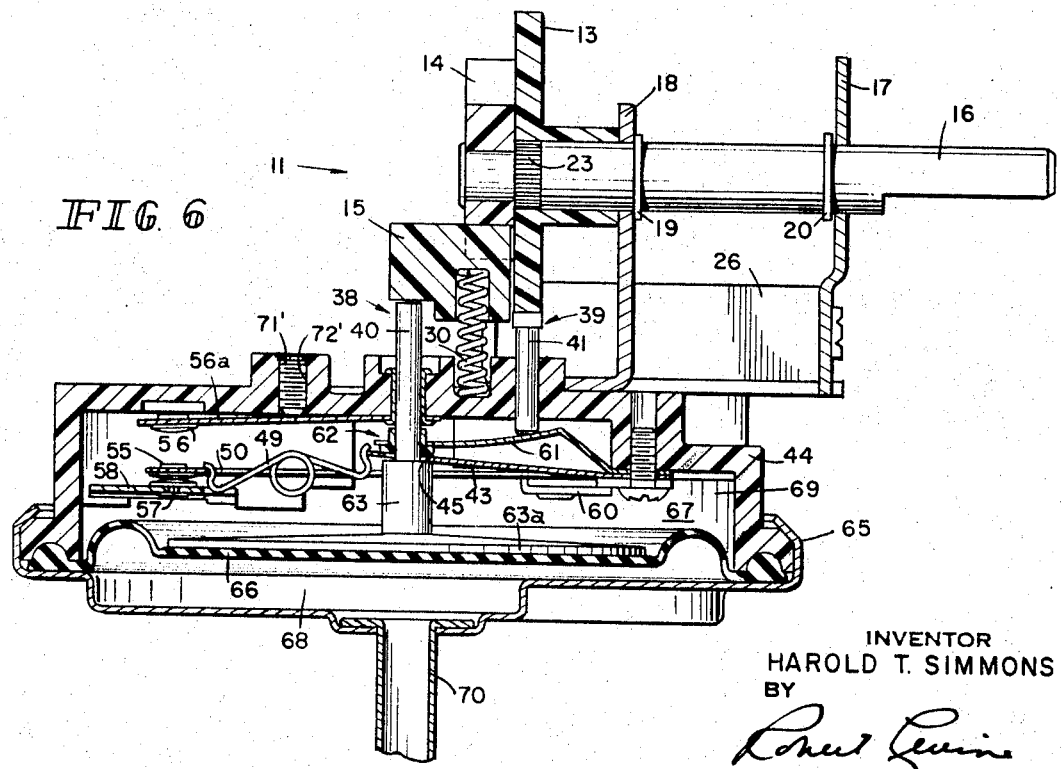

In the drawings:
FIGURE 1 is a perspective view of the manually operative pressure responsive switch illustrating the calibration means and the indexing means of the present invention.
FIGURE 2 is an exploded perspective view of the various components of the indexing means and the calibration means.
FIGURE 3 is a front view of the pressure responsive switch showing the relationship of the component parts of the indexing means.
FIGURE 4 is a bottom view of the pressure responsive switch illustrating the overcenter snap switch and the relationship of its component parts.
FIGURE 5 is a cross sectional view taken along line 5—5 of FIGURE 3 of an embodiment of the pressure responsive switch illustrating the overcenter snap switch and the cooperatively associated control means having provision for a plurality of fluid pressure levels and a fixed reset fluid pressure level.
FIGURE 6 is a cross sectional view similar to that of FIGURE 5 of another embodiment of the pressure responsive switch illustrating the overcenter snap switch and the cooperatively associated control means having provision for a plurality of fluid pressure levels having a constant differential reset fluid pressure level.

Generally speaking, the objects of the invention are accomplished by providing a pressure responsive switch that is responsive to a movable means after a predetermined condition is exceeded. A means couples the switch to the movable means. An adjustable control means engages the switch so as to prevent actuation of the switch until the predetermined condition is exceeded.

More particularly, the switch includes a housing and a diaphragm mounted in the housing to form first and second compartments. A movable means extends through one of the compartments and engages the diaphragm so that the movable means is displaced by the diaphragm as the sheet responds to fluid pressure. An overcenter switch of the snap-acting variety is responsive to the displacement of the movable arm after a predetermined fluid pressure is exceeded.

The heart of the present invention lies in the control means adapted to prevent actuation of the snap switch until the predetermined fluid pressure is exceeded. The control means includes a calibration means carried by a camshaft and an indexing means, the indexing means in general comprising a detent cam carried by the camshaft and being coupled to the calibration means, and a spring-biased actuator means responsive to the detent cam, the actuator means being slidably engaged with guide means such that it can wobble as it responds to the rise and fall contours of the detent cam. The control means, which is manually adjustable, biases the return spring of the overcenter snap switch thereby regulating the reset and trip position of the switch. The calibration means biases the movable contact of the overcenter snap switch to one of a plurality of positions thereby determining the predetermined fluid level or pressure to which the overcenter snap switch is responsive.

Referring now to the drawings, which illustrate the preferred embodiments of the present invention, the pressure responsive switch is generally indicated by numeral 10. A control for the switch means 11 in general comprises an indexing means 12 and a calibration means 13. Indexing means 12 consists of a detent cam 14 and an actuator 15 responsive to the cam. The detent cam 14 and calibration means 13 are carried by camshaft 16 that is mounted on plates 17 and 18, the shaft being journalled in the plates. The plates are held in their respective position on the shaft through C-rings 19 and 20 which are adapted to fit grooves 21 and 22. Calibration means 13 is fitted to the knurled portion 23 of the shaft such that it cannot rotate independent of the shaft's rotation. Detent cam 14 is mounted on the double D-shaped configuration 24 of the shaft such that it too rotates in accordance with the shaft's rotation. To assemble the detent cam 14 and the calibration means onto the shaft, the detent is first assembled and fixed by some suitable means such as by staking. Calibration means 13 is then slid onto the shaft up to the knurled portion 24 where it is then adjusted to a desired position after which it is fitted over the knurled portion.

Mounting plate 18 is formed from bracket 25, the sides 26 and 27 being held to mounting plate 17 through cooperating tabs and apertures 28, 28' and 29, 29'.

Actuator 15 is spring biased through compression spring 30. It is slidably mounted on guide means 31 which consists of tabs 32 and 33 through grooves 34 and 35. Spring 30 is seated on the top surface 36 of cup-shaped housing 44.

The contour of the calibration means 13 is that of a gradual but constantly rising rise contour that traverses substantially 360 degrees of the periphery of the calibration means. The fall contour is distinct and is shown to be abrupt; however, the fall contour may be sloping, if desired.

The indexing means, as stated previously, includes detent cam 14. The cam has a camming surface of alternate rise and fall contours. As illustrated, it has three of such surfaces. These contours are utilized to determine three separate and distinct pressures to which the manually adjustable pressure responsive switch will respond depending upon which of the three positions the cam is associated with on actuator 15. It is seen that the rise and fall contours are such that three fluid level positions may be obtained. If additional fluid level positions are required, additional contours may be formed as desired at which the manually adjustable pressure responsive switch is to actuate cooperatively associated circuitry.

Associated with both the actuator 15 and the calibration means 13 are reaction means 38 and 39, the means being more clearly shown in FIGURES 5 and 6. Such means in the present invention consist of plastic pins 40 and 41 which extend through top plate 36 of the switch to cooperatively engage appropriate members included in the overcenter snap switch of the pressure responsive switch.

Referring now more particularly to FIGURES 4 through 6, there is shown an overcenter snap switch 42, with FIGURES 5 and 6 more clearly illustrating its relationship to the just described switch control means. Included as part of the overcenter snap switch is actuator arm 43 that is fixedly coupled to the cup-shaped body section 44. At the opposite extremity of the arm there is included a centrally located aperture 45 therein. Notches 46 and 47 formed in the same extremity of the actuator arm serve as a seat for straight line coil springs 48 and 49 respectively. A contact carrying blade means 50 has legs 51 and 52 fixedly coupled to body section 44. It is seen that the two legs form a C-shaped opening through which the actuator arm moves. The coil springs 48 and 49 cooperatively couple the actuator arm to the contact carrying blade, the springs being coupled to their respective legs of the contact carrying blade through notches 53 and 54. The springs are under compression when positioned between the actuator arm and the contact carrying blade.

An electrical contact 55 is carried by the blade 50. Overlaying the contact 55 is a movable contact 56 and underlying the contact is a fixed contact 57. The fixed contact is integral with electrical terminal means 58. Movable contact 56 is electrically connected to electrical contact 59, while contact 55 is connected to terminal 60 through actuator arm 50. Contact 57 can also be made adjustable.

Overlaying the actuator 50 is a return spring 61. The return spring is utilized to bias the actuator arm 43 to the position illustrated in FIGURE 5 or the downward direction. With the actuator arm so biased, contact carrying blade is biased upward such that contact 55 engages a contact 56. An electrical circuit may then be traced from terminal 59 through contacts 56 and 55 to terminal 60.

FIGURE 6 illustrates that a movable means 62 including center plastic pin 40 and a substantially flat molded plastic backing means 63 has been displaced upwardly causing contact 55 to disengage contact 56 with a snap acting motion and engage fixed contact 57. An electrical circuit can now be traced from terminal 59 through contacts 55 and 57 to terminal 58.

A housing or casing 64 incorporates a lower cup-like body section 65, open at its upper extremity and inter-fitting upper cup-like body section 44, open at its lower extremity, thus effectively closing the upper extremity of the lower cup-like body section. The lower body section includes an edge 65 circumjacent its outer periphery which is crimped or rolled over an annular of the upper body section so as to clench both the body sections securely in position with respect to each other so as to form a chamber 67. The housing may be fabricated from any suitable material, but it is preferred that the lower body section 64 be fabricated from a sheet metal stamping and that the upper body section be fabricated from a suitable molded plastic.

A flexible sheet means such as resilient diaphragm 66 is formed within chamber 67 so as to extend laterally across the interior cross section of the housing. It is seen that the chamber 67 is effectively partitioned into two separate and distinct compartments, that is, a first compartment or pressure compartment 68 and a second switch compartment 69. A circular plastic backing member 63a adds stability to the diaphragm 66. The backing member is formed as part of backing member 63.

A pressure orifice 70 is fixedly inter-fitted with the lower cup-like body section 65. The pressure orifice may be either pressure fitted, welded or soldered in position of the upper body section. A suitable tubing (not shown) is coupled to the orifice thereby permitting fluid pressure to be transmitted through the tubing to the pressure compartment of the housing.

FIGURE 5 illustrates a fixed reset embodiment of the pressure responsive switch. The movable contact 56 is biased or set by pin 41 bearing against blade 56a which carries the movable contact, the pin being set by calibration means 13. That is, the setting of the calibration means 13 determines the setting of the movable contact 56 which in turn determines the amount of traverse the contact carrying blade 50 must travel to engage either of the movable contact 56 or the fixed contact 57. The vertical distance between the contact carrying blade 50 and the actuator arm, substantially taken at the notches 53 and 54 of the blade, varies thereby varying the vertical distance the actuator arm must traverse prior to the actuation of the overcenter snap switch. This distance is directly proportional to a variance in fluid pressure required to be exerted on the actuator arm from the pressure compartment before the snap switch will be actuated from its initial position.

The pressure level at which the snap switch will reset itself may be regulated by stop means comprising set screw 71 which may be turned into or out of threaded aperture 72. FIGURE 5 clearly shows that the tip of the set screw rides against the return spring 61 and the return spring rides against the actuator arm 43. The position of the set screw within the threaded aperture determines the position of the return spring and hence the vertical distance separating the actuator arm and the contact carrying blade after the contact carrying blade has been displaced from its initial position.

Fluid pressure causes diaphragm 66 to bias pin 40 upward. Actuator arm 43 is biased upward through the backing means 63 upward until the coil spring 49 is slanted in the direction opposite from what is shown. Contact carrying blade 50 is then snapped to fixed contact 57. This position remains until the fluid pressure biasing diaphragm 66 is reduced, or until the detent 15 is reset.

The embodiment of FIGURE 6 illustrates substantially the same structure as is shown in FIGURE 5, except that stop means consisting of set screw 71' is now positioned in threaded aperture 72' to bias blade 56a carrying movable contact 56, and pin 41 which is biased by calibration means 13, is positioned to bias return spring 61. The set screw engaging the movable contact blade 56a is used for the setting of the differential pressure required between actuation and reset of the snap switch. The pin 41 is used to set the fluid pressure at which the overcenter switch will actuate.

With particular reference to FIGURE 3, there is illustrated a particular feature of the pressure responsive switch. This feature, which relates to the indexing means 12, permits the pressure responsive switch to be reset when rotated from one select position to any other select positions with positive prevention of indexing "hang up." To be more specific, the detent cam 14 in conjunction with actuator 15 is so constructed such that the reset is accomplished and locked in by the depressions 73 formed in the cam surface 37 of the detent 14. Thus, the operator of the device continues rotation of the detent cam 14 until the ramp 74 of the actuator 15 seats in the appropriate depression 73. As the detent cam 14 is rotated through camshaft 16, actuator 15 slidably pivots as indicated by the arrow. Thus there is a positive method of preventing the actuator 15 from "hanging up" as shown in FIGURE 3. In the case of a washer, for example, such "hanging up" would cause the washer to overflow.

While the invention has been described in its preferred embodiments, it will be understood that modifications and variations may be effected without departing from the scope of the novel concepts of the invention as set forth in the appended claims.

What is claimed is:

1. In a pressure responsive switch wherein a snap switch is actuated in accordance with a diaphragm responsive to a fluid pressure, a manually rotatable control means for setting the pressure at which said switch is actuated, said control means including a detent means and a spring biased actuator means responsive to said detent means, said actuator means slidably and pivotally mounted over a reaction means positioning said diaphragm.

2. In a pressure responsive switch according to claim 1 wherein said actuator blade is spring biased through a compression spring disposed between said actuator means and the housing for said responsive switch.

3. In a pressure responsive switch according to claim 1 wherein said actuator means is slidably and pivotally mounted in cooperating guide means.

4. In a pressure responsive switch according to claim 3 wherein said guide means includes spaced substantially parallel tabs extending from a bracket carrying said control means, said tabs having grooves formed therein carrying said actuator means.

5. In a pressure responsive switch according to claim 1 wherein said control means further includes a calibration means, said detent means and said calibration means mounted on a rotatable shaft.

6. In a pressure responsive switch according to claim 5 wherein said calibration means biases reaction means positioning a return spring of said responsive switch.

7. In a pressure responsive switch according to claim 5 wherein said calibration means biases reaction means positioning a contact blade of said pressure responsive switch.

8. In a pressure responsive switch according to claim 1 wherein said detent means includes rise and fall contours determining predetermined positions of said diaphragm means.

9. In a pressure responsive switch according to claim 8 wherein said actuator means includes ramp means cooperating with said rise and fall contours.

References Cited

UNITED STATES PATENTS

| 3,249,712 | 5/1966 | Rhodes et al. | 200—83.9 |
| 3,267,232 | 8/1966 | Chapin. | |
| 3,319,023 | 5/1967 | Lake et al. | 200—83 |

ROBERT K. SCHAFER, *Primary Examiner.*

H. BURKS, *Assistant Examiner.*